(12) United States Patent
Kommrusch et al.

(10) Patent No.: US 12,236,675 B2
(45) Date of Patent: Feb. 25, 2025

(54) METHODS AND SYSTEMS FOR TRAINING AND EXECUTION OF IMPROVED LEARNING SYSTEMS FOR IDENTIFICATION OF COMPONENTS IN TIME-BASED DATA STREAMS

(71) Applicant: Leela AI, Inc., Newtonville, MA (US)

(72) Inventors: Steven James Kommrusch, Fort Collins, CO (US); Henry Bowdoin Minsky, Newton, MA (US); Milan Singh Minsky, Newton, MA (US); Cyrus Shaoul, Dummerston, VT (US); Max Carlson, Tallin (EE)

( * ) Notice: Subject to any disclaimer, the term of this patent is extended or adjusted under 35 U.S.C. 154(b) by 0 days.

(21) Appl. No.: 18/113,247

(22) Filed: Feb. 23, 2023

(65) Prior Publication Data

US 2023/0267712 A1 Aug. 24, 2023

Related U.S. Application Data

(60) Provisional application No. 63/389,075, filed on Jul. 14, 2022, provisional application No. 63/313,558, filed on Feb. 24, 2022.

(51) Int. Cl.
| | |
|---|---|
| *G06V 10/774* | (2022.01) |
| *G06V 10/22* | (2022.01) |
| *G06V 10/26* | (2022.01) |
| *G06V 10/776* | (2022.01) |
| *G06V 10/82* | (2022.01) |
| *G06V 10/94* | (2022.01) |

(Continued)

(52) U.S. Cl.
CPC ............ *G06V 10/774* (2022.01); *G06V 10/22* (2022.01); *G06V 10/267* (2022.01); *G06V 10/776* (2022.01); *G06V 10/82* (2022.01); *G06V 10/945* (2022.01); *G06V 10/98* (2022.01); *G06V 20/40* (2022.01)

(58) Field of Classification Search
CPC .... G06V 10/22; G06V 10/267; G06V 10/774; G06V 10/776; G06V 10/82; G06V 10/94; G06V 10/98; G06V 20/40
See application file for complete search history.

(56) References Cited

U.S. PATENT DOCUMENTS

| | | |
|---|---|---|
| 9,262,698 B1 | 2/2016 | George |
| 9,373,085 B1 | 6/2016 | George |

(Continued)

OTHER PUBLICATIONS

Baayen, R. Harold et al., "Comprehension without segmentation: a proof of concept with naive discriminative learning," Language, Cognition and Neuroscience, pp. 1-23 (2015).

(Continued)

*Primary Examiner* — Michael J Vanchy, Jr.
(74) *Attorney, Agent, or Firm* — Blueshift IP, LLC; Cynthia M. Gilbert

(57) ABSTRACT

A method for training a learning system to identify components of time-based data streams includes processing, by a machine vision component in communication with a learning system, a video file to detect at least one object in the video file. The method includes generating by the machine vision component an output including data relating to the at least one object and the video file. The method includes analyzing, by a learning system, the output. The method includes identifying, by the learning system, an unidentified object in the processed video file.

9 Claims, 9 Drawing Sheets

(51) Int. Cl.
*G06V 10/98* (2022.01)
*G06V 20/40* (2022.01)

(56) References Cited

U.S. PATENT DOCUMENTS

| | | | |
|---|---|---|---|
| 9,607,262 | B2 | 3/2017 | George |
| 9,607,263 | B2 | 3/2017 | George |
| 9,792,531 | B2 | 10/2017 | Georgescu |
| 10,185,914 | B2 | 1/2019 | Stone |
| 10,275,705 | B2 | 4/2019 | George |
| 10,521,725 | B2 | 12/2019 | Kansky |
| 10,799,798 | B2 | 10/2020 | Aghdaie |
| 10,885,388 | B1 | 1/2021 | Kim |
| 10,963,792 | B1 | 3/2021 | Kim |
| 11,120,303 | B2 | 9/2021 | Albaghajati |
| 11,210,585 | B1 | 12/2021 | Heess |
| 11,210,851 | B1* | 12/2021 | Nussbaum ............ H04W 4/021 |
| 11,263,460 | B1* | 3/2022 | Rattner ................. G06N 3/045 |
| 2006/0230008 | A1 | 10/2006 | Burgener |
| 2009/0144293 | A1 | 6/2009 | Chowdhury |
| 2010/0223216 | A1 | 9/2010 | Eggert |
| 2015/0099946 | A1* | 4/2015 | Sahin ....................... A61B 7/04 600/301 |
| 2018/0232436 | A1 | 8/2018 | Elson |
| 2018/0341632 | A1 | 11/2018 | Akkiraju |
| 2019/0294673 | A1 | 9/2019 | Sapugay |
| 2019/0304157 | A1 | 10/2019 | Amer |
| 2019/0311036 | A1 | 10/2019 | Shanmugam |
| 2019/0324795 | A1 | 10/2019 | Gao |
| 2019/0346272 | A1 | 11/2019 | Banino |
| 2019/0370686 | A1 | 12/2019 | Pezzillo |
| 2020/0166896 | A1 | 5/2020 | Clune |
| 2020/0226463 | A1 | 7/2020 | Chen |
| 2020/0380964 | A1 | 12/2020 | Kang |
| 2021/0073327 | A1 | 3/2021 | Brunn |
| 2021/0217418 | A1 | 7/2021 | Wei |
| 2021/0240851 | A1 | 8/2021 | Badalone |
| 2021/0279424 | A1 | 9/2021 | Galitsky |
| 2021/0279470 | A1* | 9/2021 | Zadeh ................... G06F 11/327 |
| 2021/0334474 | A1 | 10/2021 | Shaoul |
| 2021/0334544 | A1 | 10/2021 | Minsky |
| 2021/0334671 | A1 | 10/2021 | Minsky |
| 2021/0334758 | A1* | 10/2021 | Suchkov ................ G06V 40/20 |

OTHER PUBLICATIONS

Chaput, Harold Henry, The Constructivist Learning Architecture: A Model of Cognitive Development for Robust Autonomous Robots, Report TR04-34, Artificial Intelligence Laboratory, The University of Texas at Austin, Austin, TX, Presented in Partial Fulfillment of the Requirements for the Degree of Doctor of Philosophy, 91 pages (Aug. 2004).
Dilek Hakkani-T?R et al, "Multi-Domain Joint Semantic Frame Parsing Using Bi-Directional RNN-LSTM", Interspeech 2016, (Sep. 8, 2016), vol. 2016, doi:10.21437/Interspeech.2016-402, ISSN 1990-9772, pp. 715-719, XP055406473.
Drescher, Gary L., "Made-up Minds, A Constructivist Approach to Artificial Intelligence," The MIT Press, Cambridge, MA, 219 pages (1991).
Hakkani-Tur, D. et al., "Multi-Domain Joint Semantic Frame Parsing using Bi-directional RNN-LSTM," Interspeech 2016, vol. 2016, pp. 715-719 (Sep. 8, 2016).
Holmes, Michael P. and Charles Lee Isbell, Jr., "Schema Learning: Experience-Based Construction of Predictive Action Models," Advances in Neural Information Processing Systems, NIPS 2004, Vancouver, British Columbia, Canada, 8 pages (Dec. 13-18, 2004).
Horswill, Ian, "Visual routines and visual search: a real-time implementation and an automata-theoretic analysis," MIT Artificial Intelligence Laboratory, IJCAI'95: Proceedings of the 14th International Joint Conference on Artificial Intelligence, vol. 1: 7 pages (Aug. 1995).

International Search Report and Written Opinion for Int'l Application No. PCT/US2021/029722, titled: Natural Language System and Methods, Date of Mailing: Aug. 12, 2021. 9 pages.
Kommrusch Steve et al., "Self-Supervised Learning for Multi-Goal Grid World: Comparing Leela and Deep Q Network", Proceedings of Machine Learning Research, (Feb. 27, 2020), pp. 81-97, URL: http://proceedings.mlr.press/v131/kommrusch20a/kommrusch20a.pdf, (Jul. 26, 2021), XP055827763.
Luxem, "Deep Latent Variable Models: Unravel Hidden Structures," Towards Data Science, Jul. 31, 2019, 12 pages.
Mahoney, James V., "Image Chunking: Defining Spatial Building Blocks for Scene Analysis," Master's Thesis, Technical Report AI-TR 980, MIT Artificial Intelligence Laboratory, Cambridge, MA, 189 pages (1987).
Mahoney, James V., "Signal-based figure/ground separation," Signal Geometry. Unpublished Technical Report, Xerox Palo Alto Research Center, 3333 Coyote Hill Rd., Palo Alto CA, 6 pages (1992).
Mahoney, James V., "Signal-based Visual Routines," Xerox Palo Alto Research Center, 3333 Coyote Hill Rd., Palo Alto CA, 32 pages (Jan. 24, 1994).
Marr, D., "Early Processing of Visual Information," Massachusetts Institute of Technology Artificial Intelligence Laboratory, A.I. Memo No. 340, 67 pages (Dec. 1975).
McCallum, Andrew Kachites, "Learning Visual Routines with Reinforcement Learning," In AAAI Fall Symposium 1996, Dept. of Computer Science, University of Rochester, Rochester, NY, pp. 82-86 (1996).
Mnih, Volodymyr et al., "Playing Atari with Deep Reinforcement Learning," 9 pages (Dec. 19, 2013).
Mugan, Jonathan and Benjamin Kuipers, "Learning Distinctions and Rules in a Continuous World through Active Exploration," In Proceedings of the International Conference on Epigenetic Robotics (EpiRob-07), 8 pages (2007).
PCT International Search Report and Written Opinion for International Application No. PCT/US2021/029712, entitled Computer Vision Learning System, mailed on Sep. 28, 2021 22 pages.
PCT International Search Report and Written Opinion for International Application No. PCT/US2021/029717, entitled Learning Agent, mailed Oct. 14, 2021 23 pages.
PCT Invitation to Pay Additional Fees with Annex to Partial International Search Report and Provisional Opinion Accompanying the Partial Search Result for International Application No. PCT/US2021/029712, entitled "Computer Vision Learning System," mailed Aug. 5, 2021 17 pages.
PCT Invitation to Pay Additional Fees with Annex to Partial International Search Report and Provisional Opinion Accompanying the Partial Search Result for International Application No. PCT/US2021/029717, entitled "Learning Agent," mailed Aug. 19, 2021 17 pages.
Perotto, Filipo Studzinski et al., "Constructivist Anticipatory Learning Mechanism (CALM)—dealing with partially deterministic and partially observable environments," International Conference on Epigenetic Robotics (EPIROB), Piscataway, NJ, USA, pp. 117-127 (Nov. 2, 2007).
Perotto, Filipo Studzinski et al., "Learning Regularities with a Constructivist Agent," Proceedings of the International Joint Conference on Autonomous Agents and Multiagent Systems, ACM, 2 Penn Plaza, Suite 701, New York, NY 10121-0701, USA, pp. 807-809 (May 8, 2006).
Rao, Satyajit, "Visual Routines and Attention," Ph.D. Thesis, Massachusetts Institute of Technology, Dept. of Electrical Engineering and Computer Science, 93 pages (1998).
Salgian, Garbis and Dana H. Ballard, "Visual Routines for Autonomous Driving," In Proceedings of the 6th ICCV, Bombay, India, 7 pages (Jan. 4-7, 1998).
Salgian, Garbis, Supervised by: Dana H. Ballard, "Tactical Driving Using Visual Routines," Department of Computer Science, The College Arts and Sciences, University of Rochester, Rochester, NY, 95 pages (1998).
Studzinski Perotto Filipo et al, "Constructivist Anticipatory Learning Mechanism (CALM): Dealing with Partially Deterministic and Partially Observable Environments", International Conference on

(56) References Cited

OTHER PUBLICATIONS

Epigenetic Robotics (EPIROB), Piscataway, NJ, USA, Oct. 29, 2007-Nov. 2, 2007, (Nov. 2, 2007), pp. 117-127, URL: http://www.lucs.lu.se/LUCS/135/Perotto.pdf, (Aug. 3, 2021), XP055829984.

Ullman, Shimon and Amnon Sha'ashua, "Structural Saliency: The Detection of Globally Salient Structures Using a Locally Connected Network," Technical Report A.I. Memo No. 1061, Massachusetts Institute of Technology Artificial Intelligence Laboratory, Cambridge, MA, 24 pages (Jul. 1988).

Ullman, Shimon et al, "A model for discovering 'containment' relations," Cognition, 183: 67-81 (Feb. 2019).

Ullman, Shimon, "Visual routines," Cognition, 18: 97-159, (1984).

Whitehead, Steven D., Supervised by: DanaH. Ballard, "Reinforcement Learning for the Adaptive Control of Perception and Action," Technical Report 406, University of Rochester, Dept. of Computer Science, Submitted in Partial Fulfillment of the Requirements for the Degree of Doctor of Philosophy, 180 pages (Feb. 1992).

Yarbus, Alfred L., "Eye Movements and Vision," Institute for Problems of Information Transmission, Academy of Sciences of the USSR, Moscow, Translation Editor: Lomin A. Riggs, 121 pages (1967).

Office Action (Non-Final Rejection) dated Aug. 3, 2023 for U.S. Appl. No. 17/302,260 (pp. 1-27).

Filipo Studzinski Perotto, Jean-Christophe Buisson, Luis Otávio Alvares, "Constructivist Anticipatory Learning Mechanism (CALM)—dealing with partially deterministic and partially observable environments", Proceedings of the Seventh International Conference on Epigenetic Robotics, 2007, pp. 1-8 (Year: 2007).

Garbis Salgian and Dana H. Ballard, "Visual Routines for Vehicle Control", Springer, The confluence of vision and control, 1998, pp. 244-256 (Year: 1998).

Kai-yuh Hsiao, Steganie Tellex, Soroush Vosoughi, Rony Kubat and Deb Roy, "Object schemas for grounding language in a responsive robot", Connection Science, vol. 20, No. 4, Dec. 2008, pp. 253-276 (Year: 2008).

Office Action (Non-Final Rejection) dated Dec. 22, 2023 for U.S. Appl. No. 17/243,442 (pp. 1-39).

Baldassarre, Gianluca. "Planning with neural networks and reinforcement learning." (2001). (Year: 2001).

Office Action (Final Rejection) dated Feb. 13, 2024 for U.S. Appl. No. 17/302,260 (pp. 1-22).

Office Action (Non-Final Rejection) dated Sep. 16, 2024 for U.S. Appl. No. 17/302,260 (pp. 1-20).

Office Action (Notice of Allowance and Fees Due (PTOL-85)) dated Apr. 2, 2024 for U.S. Appl. No. 17/243,442 (pp. 1-22).

Office Action (Notice of Allowance and Fees Due (PTOL-85)) dated Jul. 25, 2024 for U.S. Appl. No. 17/243,442 (pp. 1-20).

Office Action (Non-Final Rejection) dated Oct. 7, 2024 for U.S. Appl. No. 17/243,445 (pp. 1-26).

Office Action (Notice of Allowance) dated Nov. 1, 2024 for U.S. Appl. No. 17/243,442 (pp. 1-3).

\* cited by examiner

METHODS AND SYSTEMS FOR TRAINING AND EXECUTION OF IMPROVED LEARNING SYSTEMS FOR IDENTIFICATION OF COMPONENTS IN TIME-BASED DATA STREAMS

CROSS-REFERENCE TO RELATED APPLICATIONS

This application claims priority from U.S. Provisional Patent Application Ser. No. 63/313,558, filed on Feb. 24, 2022, entitled "Methods and Systems for Training and Execution of Improved Learning Systems for Identification of Components in Time-Based Data Streams," and from U.S. Provisional Patent Application Ser. No. 63/389,075, filed on Jul. 14, 2022, entitled Methods and Systems for Training and Execution of Improved Learning Systems for Identification of Components in Time-Based Data Streams," each of which is hereby incorporated by reference.

BACKGROUND

The disclosure relates to methods for training and execution of learning systems. More particularly, the methods and systems described herein relate to functionality for training and execution of improved learning systems for identification of components in time-based data streams.

Conventionally, approaches for training a neural network to detect patterns in input data rely on human beings labeling the input data so that the neural network can learn to recognize actions and/or events and/or objects from the human-provided labels. The technical complexity and challenges involved in improving such systems typically prevent implementation of other approaches. However, there is a need for a hybrid approach to training that would enable self-directed, dynamic learning by the neural network while incorporating feedback from a new type of user interface that would enable a human user to improve the system identification of actions and actors of interest in the input data would provide an improved technology for training neural networks and reducing the reliance on human input. There is also a need for improved learning systems that provide functionality for improving an initial generation of object identification data while minimizing the complexity and addressing the implementation challenges of conventional approaches.

BRIEF SUMMARY

In one aspect, a method for training a learning system to identify components of time-based data streams includes processing, by a machine vision component executing on a first computing device and in communication with a learning system executing on a second computing device, a video file to detect at least one object in the video file. The method includes displaying, by the learning system, on a display of the second computing device, the processed video file. The method includes receiving, by the learning system, user input including an identification of an unidentified object in the processed video file displayed by the learning system.

In another aspect, a method for training a learning system to identify components of time-based data streams includes processing, by a machine vision component in communication with a learning system, a video file, to detect at least one object in the video file. The method includes generating by the machine vision component, an output including data relating to the at least one object and to the video file. The method includes analyzing, by the learning system, the output. The method includes identifying, by the learning system, an unidentified object in the processed video file.

In another aspect, a method for training a learning system to identify components of time-based data streams includes processing, by a machine vision component in communication with a learning system, a video file to detect at least one object in the video file. The method includes generating by the machine vision component, an output including data relating to the at least one object and the video file. The method includes analyzing, by a learning system, the output. The method includes modifying, by the learning system, an identification of the at least one object in the processed video file.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION

Methods and systems described herein may provide functionality for training and execution of improved learning systems for identification of components in time-based data streams. Such systems may, for example, provide a hybrid approach to training that would enable self-directed, dynamic learning by the neural network while incorporating feedback from a new type of user interface that enables a human user to improve the system identification of actions and actors of interest in the input data. such a self-directed, dynamic learning system includes functionality for automatically learning to identify causal relationships between items in a data feed, such as between multi-modalsensory data and changes within a depicted environment reflected in that data, while providing bidirectional interconnection of the learning system with one or more neural networks for one or more sensory modes. Such systems may also provide functionality for improving an initial generation of object identification data while minimizing the complexity and addressing the implementation challenges of conventional approaches.

In some embodiments, the systems and methods described herein provide functionality to execute symbolic reasoning, such as without limitation temporal analysis, physics models, and action inference heuristics, to the initial analyses provided by neural networks, such as identification of regions of interest, object classification, and human key point positions.

In some embodiments, the systems described herein provide functionality for teaching a learning system to understand actions, events, and relations from time-based data streams, such as, for example, data streams from video input, audio input, and other sensors.

Figure 1:
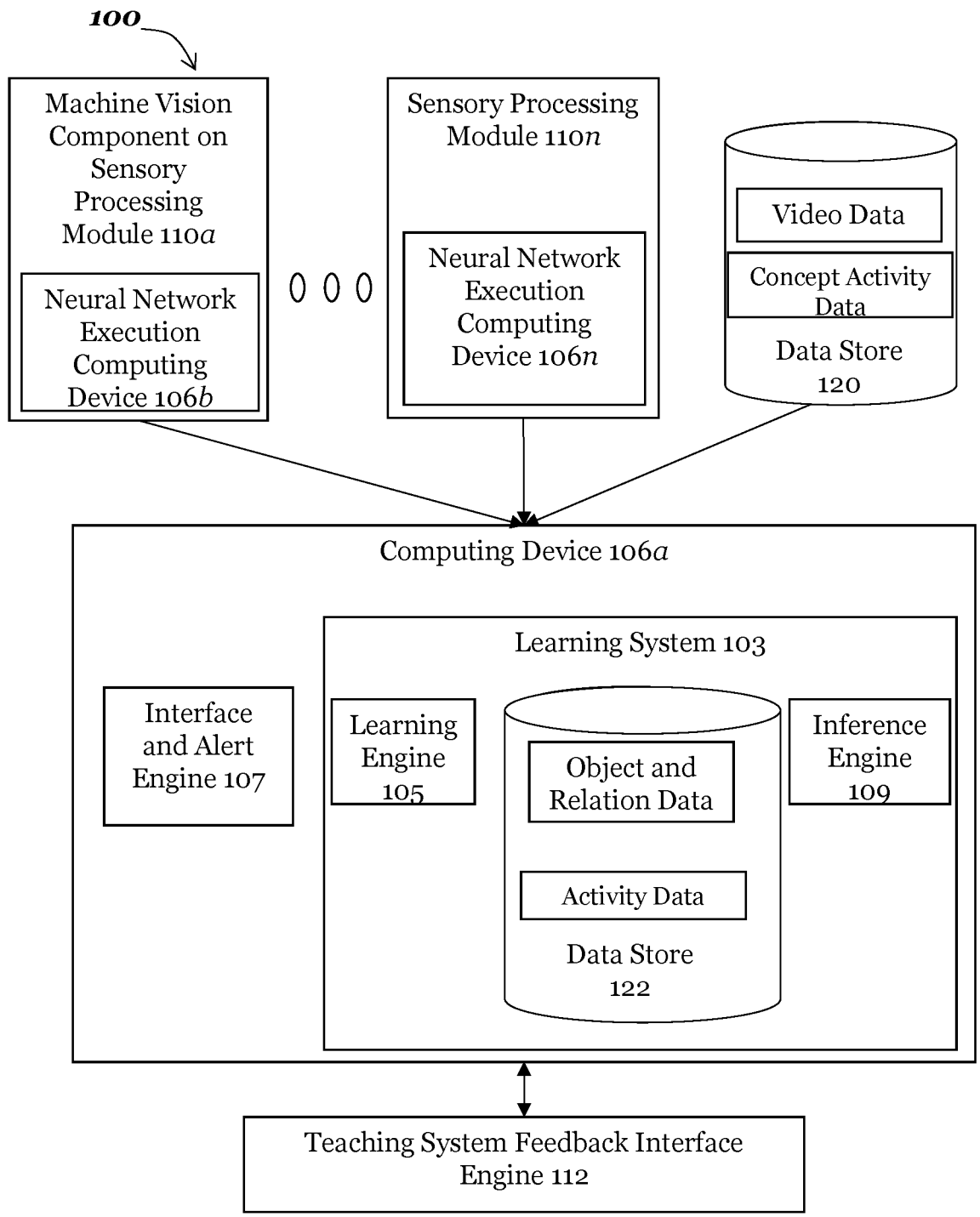
FIG. 1 is a block diagram depicting an embodiment of a system for training and execution of improved learning systems for identification of components in time-based data streams.

Referring now to FIG. 1, a block diagram depicts one embodiment of a system for training a learning system to identify components of time-based data streams. In brief overview, the system 100 includes a computing device 106a, a learning system 103, a learning engine 105, an interface and alert engine 107, at least one sensory processing module 110a-n, at least one machine vision component executing in the sensory processing module 110a, at least one neural network execution computing device 106a-n, a teaching system feedback interface engine 112, a data store 120, and a data store 122. The computing devices 106a-n may be a modified type or form of computing device (as described in greater detail below in connection with FIGS. 6A-C) that have been modified to execute instructions for providing the functionality described herein; these modifications result in a new type of computing device that provides a technical solution to problems rooted in computer technology, such as improved technology for hybrid training of learning systems including neural networks.

The learning system may simultaneously use multiple sensory modes to perceive the world around it and, in some embodiments, to guide actions taken or directed by the system. The learning system may therefore also be said to provide multi-model machine perception.

The learning system 103 may be provided as a software component. The learning system 103 may be provided as a hardware component. The computing device 106a may execute the learning system 103. The learning system 103 may be in communication with one or more other components of the system 100 executing on one or more other computing devices 106b-n.

The learning system 103 may include functionality for processing data from a plurality of sensors. The learning system 103 may include functionality for processing data from a plurality of sensor data processing systems. These include, without limitation, neural network-based detectors and classifiers, visual routine processing tools, audio event detection tools, natural language processing tools, and any other sensor system. The learning system 103 may include one or more object detection neural networks. The learning system 103 may include one or more pose detection neural networks. The learning system 103 may include a schema-inspired symbolic learning engine. The learning system 103 may include a convolutionalneural network.

The learning system 103 may provide a user interface with which a user may interact to provide feedback, which the learning system 103 may use to improve the execution of one or more other components in the system 100. In some embodiments, the interface and alert engine 107 provides this user interface. In other embodiments, the teaching system feedback interface engine 112 provides this user interface. In some embodiments, the learning system 103 provides a first user interface with which the user may provide feedback to improve the execution of the one or more components in the system 100 and a second user interface with which users may review analytical data and alert data. In other embodiments, the learning system 103 provides a single user interface that provides the functionality for both analysis and alert data review and feedback.

The learning engine 105 may be provided as a software component. The learning engine 105 may be provided as a hardware component. The computing device 106a may execute the learning engine 105 directly or indirectly; for example, the learning system 103 may execute the learning engine 105.

The interface and alert engine 107 may be provided as a software component. The interface and alert engine 107 may be provided as a hardware component. The computing device 106a may execute the interface and alert engine 107. The interface and alert engine 107 may also be referred to as a visualization dashboard and event alerting system 107.

The teaching system feedback interface engine 112 may be provided as a software component. The teaching system feedback interface engine 112 may be provided as a hardware component. The computing device 106a may execute the interface and alert engine 107. Alternatively, and as shown in FIG. 1, the teaching system feedback interface engine 112 executes on a separate computing device 106 (not shown) and is in communication with the computing device 106a.

One or more computing devices 106b-n may execute one or more sensory processing modules 110a-n. Each of the sensory processing modules may include artificial intelligence components such as the machine vision component shown in FIG. 1. The sensory processing modules 110a-n may execute components that process data from a variety of sensors including, without limitation, sensors such as, without limitation, vision, lidar, audio, tactile, temperature, wind, chemical, vibration, magnetic, ultrasonic, infrared, x-ray, radar, thermal/IR cameras, 3D cameras, gyroscopic, GPS, and any other sensor that detects changes over time.

Although the examples below may refer primarily to the use of and improvement to a machine vision system, the systems and methods described herein, therefore, provide functionality for supporting the use and improvement of other input forms as well, with the underlying theme being that the systems may provide an interface between a neural system and another learning system (e.g., the sensory processing modules 110a-n described in further detail below) to identify causal relationships. For example, for audio input in which the audio is of a situation—for example an intersection—one embodiment may include a neural network identifying object sounds (car, truck, dog), and the system 100 may improve the functioning of that neural network by identifying causal relations between objects (such as perhaps adjusting the traffic light pattern based on perceived pedestrian vs vehicle noise). Another example would relate to the use of and improvement to robotic sensory input; for instance, a house-cleaning robot that had bumper sensors and a neural network system executing on a for the sensory processing module non on a neural network execution computing device 106n predicting actions for the robot to take and would leverage the improvements from the learning system 103, such as improved functionality for recognizing animate objects like pets and humans. As a result, the methods and systems described below provide functionality for improving analysis of both video data as well as non-video sensory data. The functionality may further support viewing state data (as an example, the bumper sensors described above) as waveforms aligned with predicted causal relations. The functionality described herein may further support playing a sound file and viewing the sound waveform along with inferences based on this.

In some embodiments, as indicated above, the system 100 includes functionality for processing multiple types of data, including both video and non-video data. in such embodiments, the system 100 includes functionality for converting input data into digital and/or numerical representations, which themselves may be further transformed for improved visualization to a user (e.g., such as generating a waveform for an audio data stream or generating a line that varies in height over time to represent vibration sensor data.

The computing device 106a may include or be in communication with the database 120. The database 120 may store data related to video, such as video files received and stored for playback in a data visualization interface, such as one that is generated by the interface and alert engine 107. The database 120 may store concept activity data including, without limitation, a record of when in time and in which data stream the system detected an instance of a concept, as described in further detail below.

The computing device 106a may include or be in communication with the database 122. The database 122 may store data related to objects and relations. The database 122 may store data related to activities.

The databases 120 and 122 may be an ODBC-compliant database. For example, the databases 120 and 122 may be provided as an ORACLE database, manufactured by Oracle Corporation of Redwood Shores, CA In other embodiments, the databases 120 and 122 can be a Microsoft ACCESS database or a Microsoft SQL server database, manufactured by Microsoft Corporation of Redmond, WA In other embodiments, the databases 120 and 122 can be a SQLite database distributed by Hwaci of Charlotte, NC, or a PostgreSQL database distributed by The PostgreSQL Global Development Group. In still other embodiments, the databases 120 and 122 may be a custom-designed database based on an open source database, such as the MYSQL family of freely available database products distributed by Oracle Corporation of Redwood City, CA In other embodiments, examples of databases include, without limitation, structured storage (e.g., NoSQL-type databases and BigTable databases), HBase databases distributed by The Apache Software Foundation of Forest Hill, MD, MongoDB databases distributed by 10Gen, Inc., of NewYork, NY, an AWS DynamoDB distributed by Amazon Web Services and Cassandra databases distributed by The Apache Software Foundation of Forest Hill, MD In further embodiments, the databases 120 and 122 may be any form or type of database.

Although, for ease of discussion, components shown in FIG. 1 are described as separate modules, it should be understood that this does not restrict the architecture to a particular implementation. For instance, these components may be encompassed by a single circuit or software function or, alternatively, distributed across a plurality of computing devices.

Figure 2A:
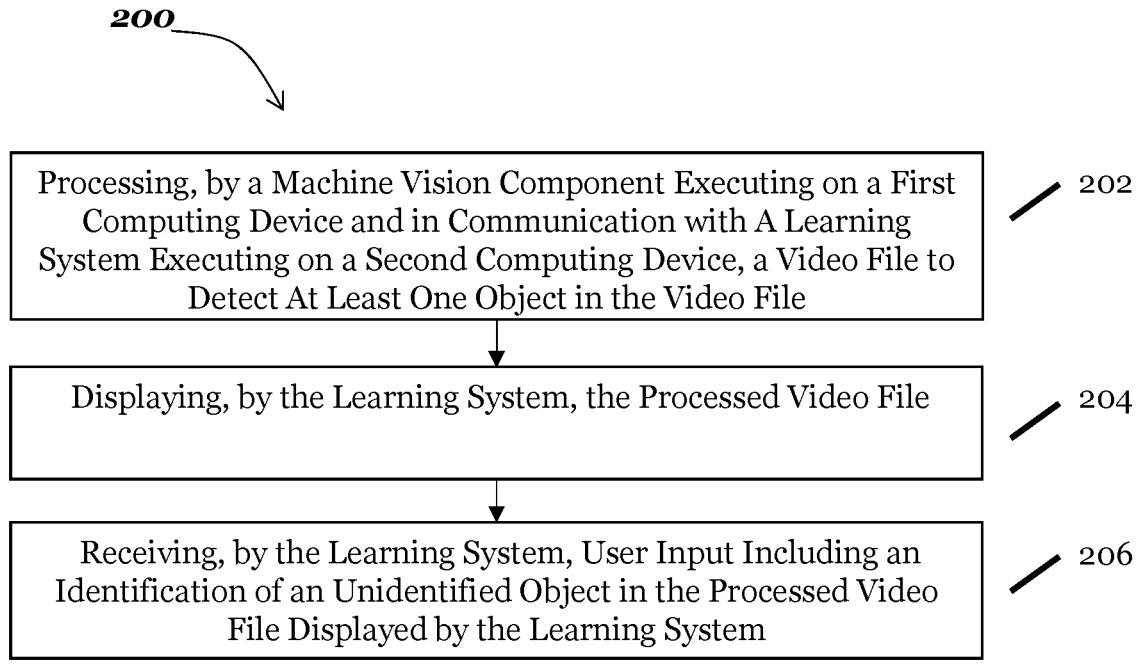
FIG. 2A is a flow diagram depicting an embodiment of a method for training a learning system to identify components of time-based data streams.

Referring now to FIG. 2A, in brief overview, a block diagram depicts one embodiment of a method 200 for training a learning system to identify components of time-based data streams. The method 200 includes processing, by a machine vision component executing on a first computing device and in communication with a learning system executing on a second computing device, a video file to detect at least one object in the video file (202). The method 200 includes displaying, by the learning system, on a display of the second computing device, the processed video file (204). The method 200 includes receiving, by the learning system, user input including an identification of an unidentified object in the processed video file displayed by the learning system (206).

Referring now to FIG. 2A, in greater detail and in connection with FIG. 1, the method 200 includes processing, by a machine vision component executing on a first computing device and in communication with a learning system executing on a second computing device, a video file to detect at least one object in the video file (202). Objects detected by the system may be associated with additional information, such as the position of a component of the object (e.g., the position of a person's body parts) or the configuration of an object as depicted in the video file (e.g., whether an umbrella is opened or closed). Objects detected by the system may be associated with one or more identifiers that are displayed along with the object when the processed video file is displayed.

The method 200 includes displaying, by the learning system, the processed video file (204). The learning system 103 may display the processed video file on a display of the computing device 106a. The learning system 103 may display the processed video file on a display of a third computing device accessible to a user of the system 103. The learning system 103 may generate a user interface to display, the user interface including a display of at least a portion of the processed video file. The learning system 103 may modify the generated user interface to include an identification of the detected at least one object. the learning system 103 may modify the generated user interface to include an identification of the object (previously unidentified) identified in the user input.

In one embodiment, prior to displaying the processed video file, the learning system 103 segments at least one image of the video into at least one region. The region selected may include video displaying the at least one object. The region selected may include a portion of the processed video file including at least one interaction between two detected objects.

The method 200 may include processing, by the learning engine 105 of the learning system 103, the at least one region; generating, by the learning system 103, a proposed identification of at least one potential object within the at least one region; displaying, by the learning system 103, the at least one region and the at least one potential object; and receiving, by the learning system, user input accepting the proposed identification. The learning system 103 may associate an identification of a level of confidence with the proposed identification and display the identification of the level of confidence with the at least one region and the at least one potential object. Such an embodiment may further include providing an instruction to the machine vision component to incorporate the proposed identification of the at least one potential object into a recognition component of the machine vision component, or otherwise directing, by the learning system, the incorporation of the proposed identification into a recognition component of the machine vision component.

In another embodiment, in which, prior to displaying the processed video file, the learning system 103 segments at least one image of the video into at least one region, the method 200 may include processing, by the learning engine 105, the at least one region; generating, by the learning engine 105, a proposed identification of at least one potential object within the at least one region; displaying, by the learning system 103, on the display, the at least one region and the at least one potential object; and receiving, by the learning system, user input rejecting the proposed identification. The learning system 103 may associate an identification of a level of confidence with the proposed identification and display the identification of the level of confidence with the at least one region and the at least one potential object. In such an embodiment, the learning system would not provide any instruction to the machine vision component regarding the proposed identification.

In another embodiment, in which, prior to displaying the processed video file, the learning system 103 segments at least one image of the video into at least one region, the method 200 may include processing, by the learning engine 105, the at least one region; generating, by the learning engine 105, a proposed identification of at least one potential object within the at least one region; and receiving, by the learning system, from a rules inference engine in communication with, or comprising part of, the learning system 103 (e.g., the inference engine 109), input directing acceptance of the proposed identification. The learning system 103 may provide the generated proposed identification to the rules inference engine. The learning system 103 may associate an identification of a level of confidence with the proposed identification and provide the identification of the level of confidence with the generated proposed identification of the at least one potential object. Such an embodiment may further include providing an instruction to the machine vision component to incorporate the proposed identification of the at least one potential object into a recognition component of the machine vision component, or otherwise directing, by the learning system, the incorporation of the proposed identification into a recognition component of the machine vision component.

The method 200 includes receiving, by the learning system, user input including an identification of an unidentified object in the processed video file displayed by the learning system (206). Prior to providing user input, a user can log into the learning system 103 using a secure authentication method, logging in either directly or indirectly (e.g., directly to the computing device 106a or via a network connection to the computing device 106a from a client computing device 102 (not shown). The learning system 103 may therefore be accessed via any for or type of computing device 600 as described below in connection with FIGS. 6A-C, including without limitation, desktop and laptop computers, as well as tablet computers and smartphones. After logging in, a user may view data, including one or more videos or video streams received from, for example, live or pre-recorded data streams generated by one or more camera sensors. Users may upload new video files to be processed. Users may record videos from live video feeds to make new video files that can then be processed by the system 100. Users may select a specific video file to be processed, using, by way of example, a file selection interface, searching by date, time, location or detected concept within the video file.

Users can draw regions around objects that the machine vision component has not recognized and label those objects, allowing the machine vision component to learn about new kinds of objects. The user-specified regions are stored in a manner that allows the system 100 to automate the extension of an existing machine vision component to recognize these objects when performing subsequent processing. Users can choose multiple frames of video to provide many examples of a new kind of object, rapidly enhancing a level of accuracy provided by the machine vision component. The user interface displayed to the user includes functionality that allows for automatic object tracking of unrecognized objects across one or more frames to reduce the amount of manual work required by the user.

The user may request that the user interface help find relevant objects in a scene displayed to the user. The user interface will then automatically segment the image into regions. These regions will often contain one or more objects (which may be referred to as an object set). The user interface may then send the data from these regions to the learning engine 105 with a request that the learning engine 105 search these regions for functionally relevant objects in the object set, and then send proposals for objects to the user interface for analysis by the user. For example, there may be a novel object in a scene within a video file, a wire cutter, and since the tool is being used by a person in the video, the learning engine 105 would propose that this object be classified as a tool. This information would support the automatic training of a machine vision network using the object's visual data in the video to recognize this new class of object (the wire cutter). Using neural network probability details (i.e., from an output softmax layer), the user interface can suggest alternative objects which the user can consider.

Figure 2B:
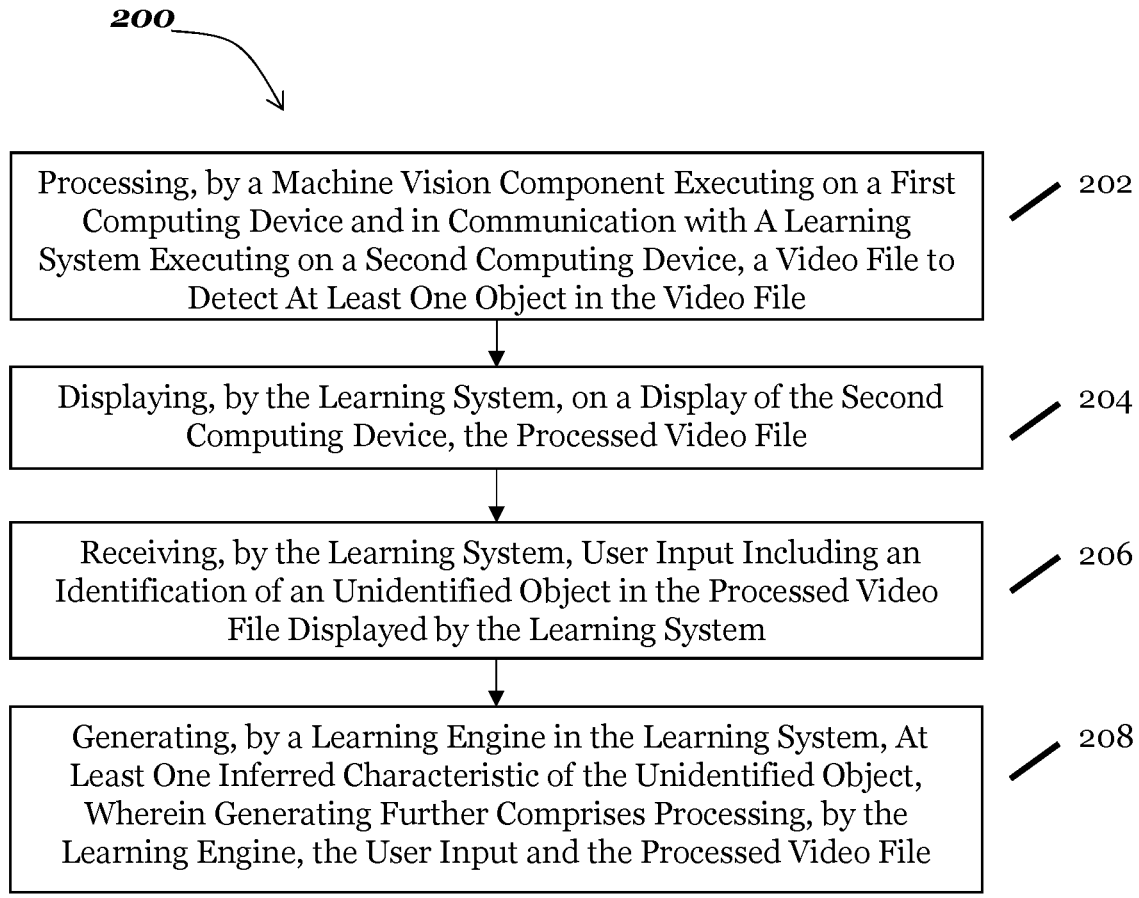
FIG. 2B is a flow diagram depicting an embodiment of a method for training a learning system to identify components of time-based data streams.

Referring now to FIG. 2B, in brief overview, a block diagram depicts one embodiment of a method 200 for training a learning system to identify components of time-based data streams. The method 200 includes processing, by a machine vision component executing on a first computing device and in communication with a learning system executing on a second computing device, a video file to detect at least one object in the video file (202). The method 200 includes displaying, by the learning system, on a display of the second computing device, the processed video file (204). The method 200 includes receiving, by the learning system, user input including an identification of an unidentified object in the processed video file displayed by the learning system (206). The method 200 includes generating, by a learning engine in the learning system, at least one inferred characteristic of the unidentified object, wherein generating further comprises processing, by the learning engine, the user input and the processed video file (208).

Referring now to FIG. 2B, in greater detail and in connection with FIGS. 1-2A, the method 200 includes processing, by a machine vision component executing on a first computing device and in communication with a learning system executing on a second computing device, a video file to detect at least one object in the video file (202). The machine vision component may process the video file as described above in connection with FIG. 2 A (202).

The method 200 includes displaying, by the learning system, on a display of the second computing device, the processed video file (204). The learning system may display the processed video file as described above in connection with FIG. 2A (204).

The method 200 includes receiving, by the learning system, user input including an identification of an unidentified object in the processed video file displayed by the learning system (206). The learning system may receive the user input as described above in connection with FIG. 2A (206).

The method 200 includes generating, by a learning engine in the learning system, at least one inferred characteristic of the unidentified object, wherein generating further comprises processing, by the learning engine, the user input and the processed video file (208). Once the user has submitted information about the location and appearance of the new object, the user interface communicates with the learning engine 105 and the learning engine 105 may use the spatial and temporal context of the new object to learn about the functionality of the unrecognized object. For example: if the object is a stool, the learning system 103 may observe that many people (e.g., a number of people meeting or exceeding a threshold number of people) have sat on the object, and that the object is stationary. The inference is that the stool is a kind of seating device. This information is stored in the learning system 103 for later use in reasoning about the object.

Although described in FIG. 3 below in connection with processing of video files, those of ordinary skill in the art will understand that a variety of types of data files may be processed using the improved methods described herein. A method for training a learning system to identify components of time-based data streams may include processing, by a sensory processing module executing on a neural network execution computing device and in communication with a learning system, a data file to detect at least one object in the data file; recognizing by the learning system an incorrectly processed datum in the processed data file resulting in an error in the processed data file; generating, by a learning engine in the learning system, at least one corrected datum responsive to the recognized error; and using the generated at least one corrected datum to incrementally train the sensory processing module.

Figure 3:
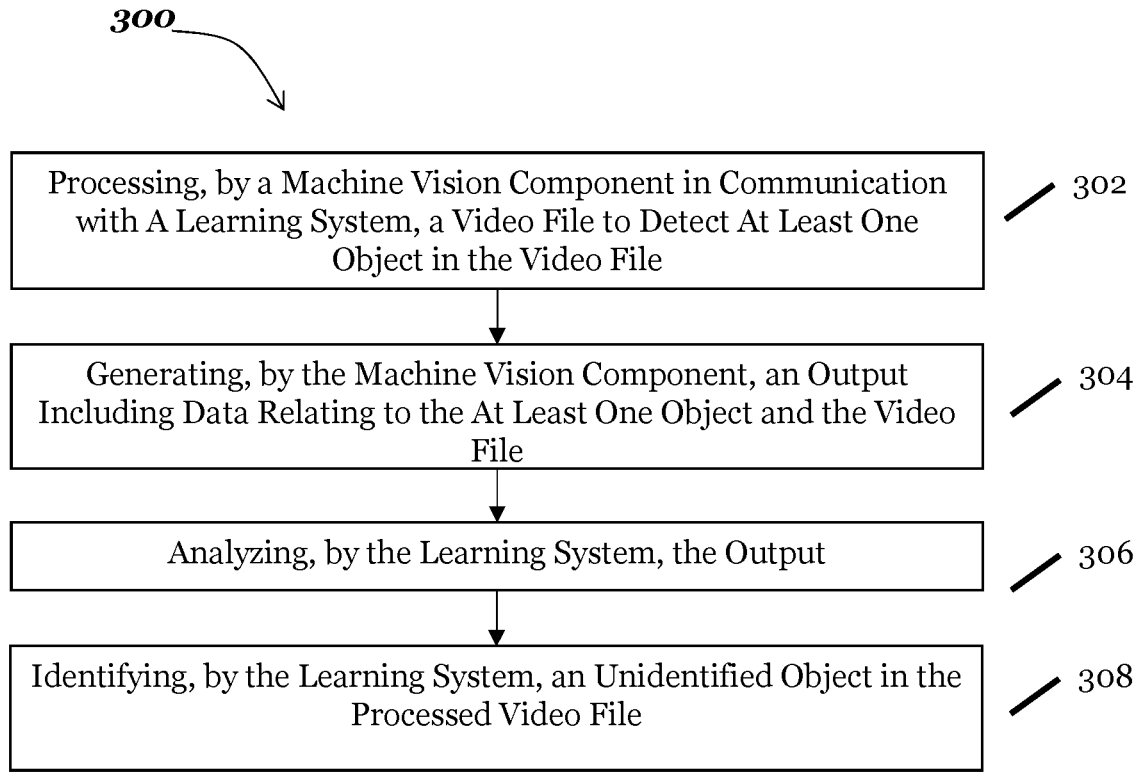
FIG. 3 is a flow diagram depicting an embodiment of a method for training a learning system to identify components of time-based data streams.

Referring now to FIG. 3, in brief overview, a block diagram depicts one embodiment of a method 300 for training a learning system to identify components of time-based data streams. As depicted in the method 300, the system need not display the processed video file to a user to improve an analysis of the processed video file—the system may instead provide the processed video file to the learning system for further analysis. The method 300 includes processing, by a machine vision component in communication with a learning system, a video file to detect at least one object in the video file (302). The method 300 includes generating, by the machine vision component, an output including data relating to the at least one object and the video file (304). The method 300 includes analyzing, by the learning system, the output (306). The method 300 includes identifying, by the learning system, an unidentified object in the processed video file (308).

Referring now to FIG. 3, in greater detail and in connection with FIGS. 1 and 2A-2B, the method 300 includes processing, by a machine vision component communication with a learning system, a video file to detect at least one object in the video file (302). The method 300 includes generating, by the machine vision component, an output including data relating to the at least one object and the video file (304). The machine vision component may process the video file to generate the output as described above in connection with FIG. 2 A (202).

The method 300 includes analyzing, by the learning system, the output (306). Analyzing the output may include identifying an error in an identification associated with the detected at least one object. Analyzing the output may include identification a previously undetected object. Analyzing the output may include recognizing by the learning system an incorrectly processed frame from the video file resulting in an error in input received by the learning system from the machine vision component.

The learning system 103 may access one or more taxonomies as part of analyzing the output. For example, the learning system 103 may access a taxonomy of errors for multi-instance pose estimation to analyze the processed video file and determine whether any errors were introduced in processing the video file relating to, by way of example and without limitation, jitter, inversion, swap, and misses.

The learning system 103 may access one or more data structures enumerating predefined types of errors in object detection such as, without limitation, classification errors, location errors, classification+location errors, duplicate object errors, background (false positive) errors, and missed (false negative) errors.

The learning system 103 may apply one or more rules (directly or via interaction with the inference engine 109) in analyzing the processed video file. For example, the learning system 103 may apply one or more symbolic rules to infer whether an object is or is not within a frame of the video file.

The method 300 includes identifying, by the learning system, an unidentified object in the processed video file (308). As an example, neural network recognition data (which may include objects and/or human pose information) is received by learning system 103. For instance, the learning system 103 may receive the data from the machine vision component on the sensory processing module 110a. The learning system 103 may be able to infer that specific data frames from the video stream were interpreted incorrectly by the neural network and automatically (without human involvement) provide samples which can be used to train the neural network for improved performance. As an example, the inference engine may detect an incorrectly predicted frame with a simple or complex physics model which recognizes impossible motions (for example, a human accelerating a body part beyond limits, or a smoothly moving object which the neural network fails to recognize for 1 frame); if the impossible motion is replaced with a smooth motion predicted by recent velocity and acceleration and future frames confirm the smooth motion continues, then the predicted position can provide a new training sample to improve the neural network (along with the video frame which currently produced the incorrect prediction). As another example, consider a neural network model which recognizes hammers well when they are on a table but not when being held. If a person moves to a tool table on which a hammer is recognized, moves their hand near the hammer and away again and the hammer is no longer recognized on the table (nor recognized in the hand of the person), the inference engine can create an object (a hammer) at the hand position and such a created object can now be used to provide a new training sample to the neural network. The method may include modifying, by the learning system, the processed video file to include an identification of the unidentified object.

Figure 4:
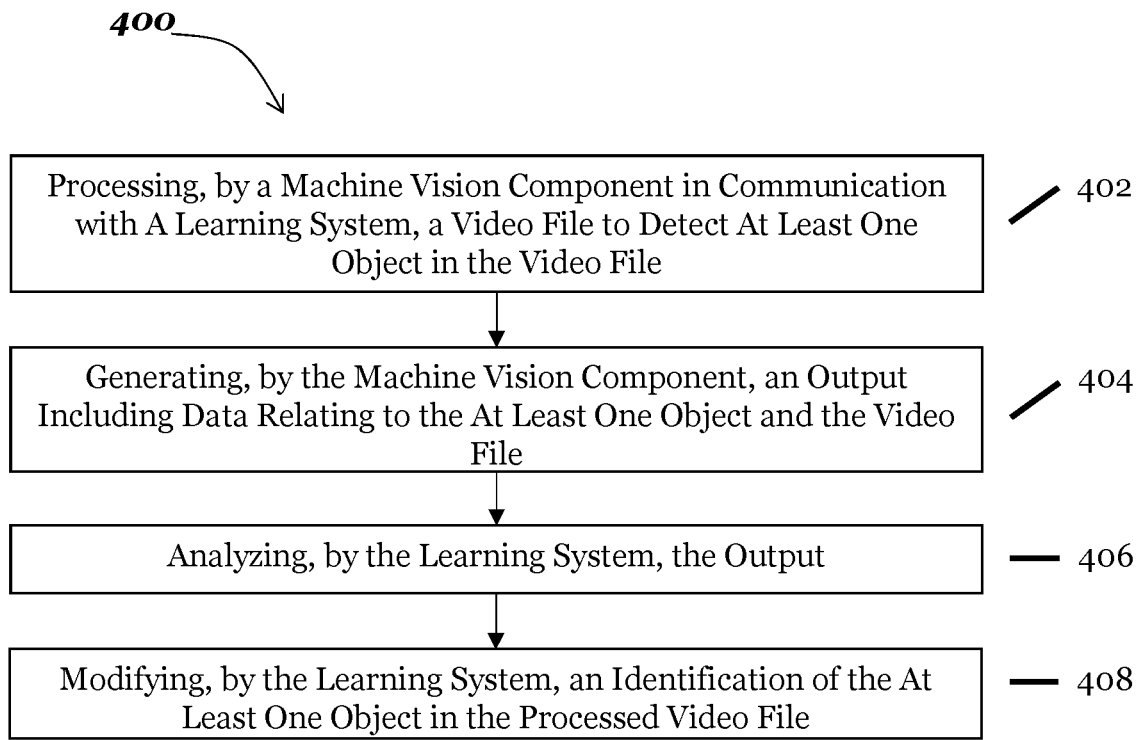
FIG. 4 is a flow diagram depicting an embodiment of a method for training a learning system to identify components of time-based data streams.

Referring now to FIG. 4, in brief overview, a block diagram depicts one embodiment of a method 400 for training a learning system to identify components of time-based data streams. The method 400 includes processing, by a machine vision component in communication with a learning system, a video file to detect at least one object in the video file (402). The method 400 includes generating, by the machine vision component, an output including data relating to the at least one object and the video file (404). The method 400 includes analyzing, by the learning system, the output (406). The method 400 includes modifying, by the learning system, an identification of the at least one object in the processed video file (408).

Referring now to FIG. 4, in greater detail and in connection with FIGS. 1-3, the method 400 includes processing, by a machine vision component communication with a learning system, a video file to detect at least one object in the video file (402). The machine vision component may process the video file as described above in connection with FIG. 2 A (202).

The method 400 includes generating, by the machine vision component, an output including data relating to the at least one object and the video file (404).

The method 400 includes analyzing, by the learning system, the output (406). Analyzing the output may include identifying an error in an identification associated with the detected at least one object. Analyzing the output may include identification a previously undetected object. Analyzing the output may include recognizing by the learning system an incorrectly processed frame from the video file resulting in an error in input received by the learning system from the machine vision component.

The method 400 includes modifying, by the learning system, an identification of the at least one object in the processed video file (408). Modifying the identification may include modifying the identification to correct an error detected during the analyzing of the output. Modifying the identification may include adding an identifier to an object that the machine vision component detected but did not identify. The method 400 may include identifying, by the learning system, a second object (e.g., a previously undetected object) and adding an identifier of the second object to the processed video file. The method may include generating, by the learning engine 105 in the learning system 103, at least one corrected sample image responsive to the recognized error and using the generated at least one corrected sample image to incrementally train the machine vision component.

In one embodiment, execution of the methods described herein provide an improved technical ability for self-supervised retraining of neural networks using object detection samples.

Figure 5:
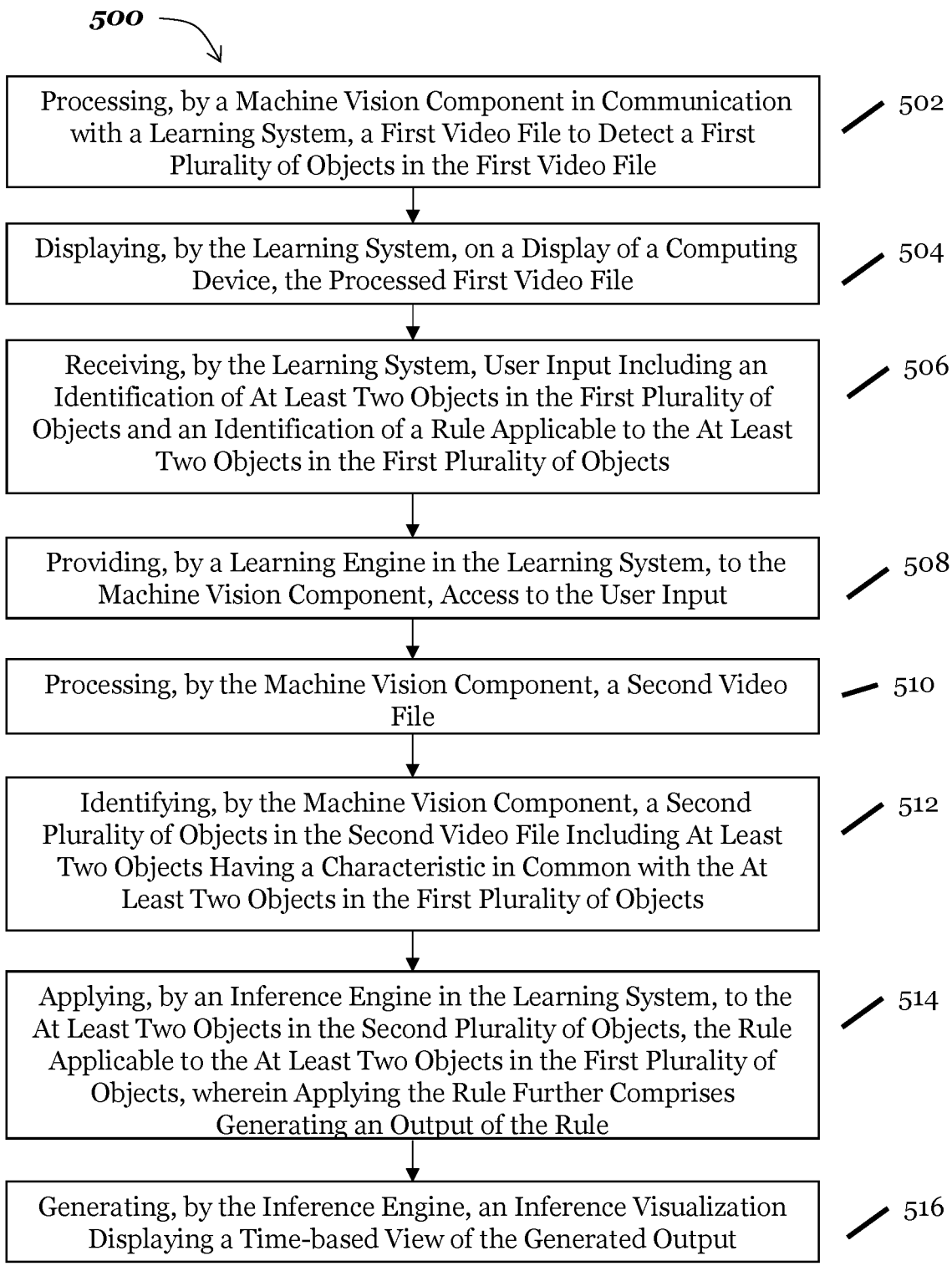
FIG. 5 is a flow diagram depicting an embodiment of a method for generating rules from and applying rules to video files.

Referring now to FIG. 5, a flow diagram depicts one embodiment of a method 500 for generating rules from and applying rules to video files. In brief overview, the method 500 includes processing, by a machine vision component executing on a first computing device and in communication with a learning system executing on a second computing device, a first video file to detect a first plurality of objects in the first video file (502). The method 500 includes displaying, by the learning system, the processed first video file (504). The method 500 includes receiving, by the learning system, user input including an identification of at least two objects in the first plurality of objects and an identification of a rule applicable to the at least two objects in the first plurality of objects (506). The method 500 includes providing, by a learning engine in the learning system, to the machine vision component, access to the user input (508). The method 500 includes processing, by the machine vision component, a second video file (510). The method 500 includes identifying, by the machine vision component, a second plurality of objects in the second video file including at least two objects having a characteristic in common with the at least two objects in the first plurality (512). The method 500 includes applying, by an inference engine in the learning system, to the at least two objects in the second plurality of objects, the rule applicable to the at least two objects in the first plurality of objects, wherein applying the rule further comprises generating an output of the rule (514). The method 500 includes generating, by the inference engine, an inference visualization displaying a time-based view of the generated output (516).

Referring now to FIG. 5 in greater detail, and in connection with FIGS. 1-4, the method 500 includes processing, by a machine vision component executing on a first computing device and in communication with a learning system executing on a second computing device, a first video file to detect a first plurality of objects in the first video file (502). The machine vision component may process the video file as described above in connection with FIGS. 1-4.

The learning system 103 may operate in a concept creation/editing mode. The learning system 103 may operate in a "ground truth" creation/editing model. In these modes, the system 100 displays to a user a visualization of objects (including people) that the system has recognized. In these modes, the system 100 may also visualize and display non-visual signals for which data has been received; for example, signals from pressure sensors, temperature, or audio data and the user may interact with the visualizations to select and specify relationships and actions including visual and other types of sensory information. These visualizations may be represented as objects in a section of the user interface that is above or below a display of a video frame and which may be proportional in size to the timeline of the video. Since the methods and systems described herein allow for signals (including both video and non-video data) to be including in the learning of novel activities, the method for displaying all the sensor data together and offering all these signals as inputs to the teaching system makes building multi-modal learning faster and easier. For example, if a user were to add another signal, such as sound, it becomes possible to build an activity recognition for the combined situation where a door is seen to open, a person is seen to enter, the sound of the door opening is detected, and the temperature changes. Detecting all 3 at once is a more robust recognition of the activity than any of these signals alone. Tying all 4 of these signals together in one GUI is innovative and powerful. If the door opens because the wind blew it open, that is a very different event. Without all 4 signals being monitored, the event would be detected as an "entry-through-door" event no matter what.

For non-visual signals that are displayed as a series of changes over time, these may be visualized in such a way as to make it clear that the timing of these changes is synchronized with the video playback. For example, if there is a temperature sensor sending sensor data into our invention alongside a video sensor, the correlation in time of the door opening and the temperature in the room dropping would be clear because the video playback marker with move along the timeline as the video played, and that marker with also move along the temperature data. When the door opens in the video, it will be clear that the temperature drops soon after.

The user interface may be configured to display data in accordance with one or more user-specified time scales, e.g., from seconds to hours or days.

The method 500 includes displaying, by the learning system, on a display of the second computing device, the processed first video file (504). The learning system 103 may display the processed first video file as described above in connection with FIGS. 1-4.

The method 500 includes receiving, by the learning system, user input including an identification of at least two objects in the first plurality of objects and an identification of a rule applicable to the at least two objects in the first plurality of objects (506). Receiving the user input may include receiving an identification of at least one set of frames in the first video file during which the video file displays the at least two objects in the first plurality of objects and during which the identified rule is applicable to the at least two objects in the first plurality of objects.

Once the machine vision component processes the video file, therefore, the learning system 103 may execute a concept creation task. By way of example, the system 100 may allow the learning system 103 to display a video or portion of a video to a user who can interact with the display to select an object and specify that the object is part of a concept. Objects may refer to people or things. The concept provides additional information about the object, such as how it is used or how it interacts with other objects. By way of example, a user may see a cup in a video and select the hand of a person holding the cup to specify that people objects may interact with cup objects in a process that the system may refer to as the concept of drinking. After selecting two or more objects or portions of objects, the user may specify a relationship between the two. The user input may include an identification of one or more modifiers such as, for example 'touching' or "near to' or "far from' or 'connected,' etc. Relationships between concepts and sub-concepts can be combined using logical operators (AND, OR, NOT, etc.) to form concept expressions that define new concepts. By way of example, if a person's right wrist or left wrist is near a cup and the elbow of the person is bent less than 90 degrees and the nose of the person is near the cup, the system should identify the concept of drinking. As another example of a concept, the user input may specify that if a person's knees are bent and the person is not moving, they will be defined as engaged in the concept of sitting. The user interface may allow the user to define concepts visually, supporting visualizations of parent-child conceptual relationships as well as within-concept relationships.

The user interface (which may be referred to as a GUI) allows existing concepts to be composed into new concepts. As an example, IF a person is HOLDING_COFFEE and DRINKING and SITTING and they will be defined as an ACTIVE_CAFE_CUSTOMER. A time component can be introduced to allow concept expressions to be created that have a notion of sequence. For example, IF a person has been INACTIVE_CAFE_CUSTOMER more than 30 minutes, the person can be defined as CAMPING_OUT. As another example, IF a person is TOUCHING the ground and the last time the MOVED action occurred is more than 30 seconds, they will be defined as FALLEN-DOWN. The GUI allows extraneous objects to be marked as ignored, e.g., ignore anything recognized as DOG. The GUI allows extraneous, misrecognized objects to be marked by type and ignored, e.g., ignore all boats in the restaurant. The GUI allows objects to be aliased, e.g., Bottle→drinking_vessel and Cup→drinking_vessel. The GUI allows objects to be marked stationary, e.g., tables and sofas. The GUI allows objects of the same kind to be remapped, e.g., if it is recognized as a CAT, but it's always really a DOG, all CATs can be remapped to DOGS.

The GUI allows objects to be marked as the main object to focus on, e.g. a specific person in a group of people. The GUI provides visualizations for some or all concepts that are apply to the focus and the relationships that are active with the focus. Visualizations of concepts, such as when certain objects light up when active, e.g., a visual marker changes color when a person is TOUCHING something. A special kind of chart (such as a sparkline chart) shows when an action has applied over time, e.g., when on the timeline, a person was TOUCHING a cup or not. The GUI allows object relationships to be visualized when one or more objects are selected, e.g., selecting the TOUCHING action on a person draws lines between a person and all the things they are touching. If, after checking the visualization, the user notices that a relationship sent from the AI learning system is incorrect, the user can mark it as inaccurate to refine the machine learning model. Additionally, the GUI can provide alternative object interpretations to be presented based on the probability scores computed by the machine learning model. The GUI allows the user to visualize regions of interest (ROI), e.g., the dangerous area around a crane and to create new regions of interest, e.g., drawing a polygonal area around train tracks designates them as a dangerous area. The GUI allows users to visually edit regions of interest (ROIs), e.g., if the AI learning system is incorrect about the area of an ROI, it can be moved by a user to refine the machine learning model, e.g., if a camera angle changed, edit an existing user-created ROI to reflect the change.

The GUI provides a specific visualization of virtual concepts in a hierarchical concept combination. The user can visualize multiple levels of concepts, including virtual concepts/super-concepts. In the simplest case, there are 2 levels: L1 and L2. The key business goal (ex: Is everybody safe?) would be a virtual concept at L1. Concepts that have been created by the user in the GUI and that inform the L1 concept are called the L2 concepts. Some examples: Has anyone fallen? Is anyone in distress? Is anyone completely motionless for more than 10 minutes outside the door?

The system 100 may provide a hierarchical concept editor that offers users the ability to create and edit virtual concepts to match the business goals. The GUI will allow the user to select one or more virtual concepts and then visually explain the state of all of the L1 (virtual) concepts and related L2 concepts detected in the video, and also visually explain how the system has decided which of the L2 concept inputs are relevant. Finally, there will be a visual representation of how the system decides if the L1 concept is relevant, based on a combination of the L2 concept activation states.

During the teaching process, the user can choose to save the concept expression knowledge representation (CEKR) which contains the current set of concept expressions, ROIs, and all the logical relationships between the concept expressions. The GUI provides access to the private library of saved CEKRs for the user. This library is browsable using keyword tags and other metadata (e.g., creation date, last modification date, and others). When changing settings for a video source, the user can choose to apply CEKRs from their private library. These CEKRs are then applied to novel video sources. The GUI can be used at that point to duplicate and rename a CEKR, and then modify and refine the duplicated CEKR, if required, (e.g., modifying the relationships, redefining the ROIs, adding relationships and others). The GUI allows users to access a concept marketplace to browse and add functionality to the existing system. These may include, without limitation, new machine vision algorithms (e.g., animal detector, machine tool detector, object size detector, 3D position estimator, and others); new kinds of common concepts (e.g., falling, mask compliance, and others) as CEKRs; and new kinds of concepts tailored to specific use cases, (e.g., construction, safety, healthcare, and others) as CEKR. Once a CEKR or group of CEKRs is ready to be used, the user selects them in the GUI and links them to a data source or data sources (usually a video stream). From that point on, the CEKR is applied to that video stream, and the concept activations are recorded in a database for downstream analysis and visualization. The concept expression knowledge representation (CEKR) that is created by this GUI can be submitted to an AI learning system at any point during the user interaction along with other data including the original video and any meta-data about the video and the objects in the video and other sensor data. The concept expressions are used to provide the AI learning system with information constraints that reduce the number of object-object relationships to track while learning about from the video. The learning system 103, therefore, may learn from the CEKRs and the streams of data.

The method 500 includes providing, by a learning engine in the learning system, to the machine vision component, access to the user input (508).

The method 500 includes processing, by the machine vision component, a second video file (510). The machine vision component may process the video file as described above in connection with FIGS. 1-4.

The method 500 includes identifying, by the machine vision component, a second plurality of objects in the second video file including at least two objects having a characteristic in common with the at least two objects in the first plurality (512). The machine vision component may identify the objects in the second video file as described above in connection with FIGS. 1-4.

The method 500 includes applying, by an inference engine in the learning system, to the at least two objects in the second plurality of objects, the rule applicable to the at least two objects in the first plurality of objects, wherein applying the rule further comprises generating an output of the rule (514). In one embodiment, the learning system 103 uses an internal model using a network (graph) of cause-and-effect nodes (which may be referred to as schemas) that infers hidden states of objects, based on how they are used in a scene. Since the learning system 103 includes a graph structure, and not simply levels, one concept may depend on another, which may depend on several others, etc.; the order of evaluation of rules is implicit in the directed graph's connectivity. Such nodes in the system's knowledge graph can be entered directly by a user via hand-written CEKR expressions, but the system also has statistical learning methods to generate its own rules from the input data stream, or to modify existing rules to better match the observed data. Therefore, the graph of knowledge nodes can be thought of as a parallel database, in which all 'rules' fire in parallel, and their outputs are propagated along directed edges in the graph, causing inferences to be generated as to the state or class of objects in the scene.

As an example, without limitation, if the system is identifying an object as a drinking vessel, the system would take as input the (unreliable) object detection classifications from the lower-level machine vision system, where some kinds of cups had been labeled. But additional CEKR rules could be entered manually or learned by the system which correlate user actions with better classification; for example if some rules were entered that asserted that an object as being lifted to a person's mouth is a drinking vessel, that rule could both label the object in the scene, and be used to feed back down to the lower level machine vision system to train it to classify that kind of image of a cup more accurately. This is where the action-based or 'causal reasoning' machinery may be leveraged; if the system can correctly classify an action (raising an object to a person's face), then it can use the occurrence of that action to further refine its ability to classify objects, based on how they are being used, and not just their appearance.

The method 500 includes generating, by the inference engine, an inference visualization displaying a time-based view of the generated output (516).

As further functionality for improving the learning algorithms of components such as machine vision components, and to measure accuracy of the learning system 103, the GUI may execute in a ground truth creation/editing mode. In this mode, the user specifies which time intervals in a video should be marked as when a concept is active, e.g., from frames 30-60 and 90-120 a person is DRINKING. The GUI offers a visualization of the AI learning system's notion of which concepts are being applied in both a sparkline representation and overlays on the video itself. Users can mark specific applications of concepts detected by the AI learning system as being inaccurately applied to refine the machine learning model. This feedback will be used by the learning model to refine and improve the concept. The GUI may visualize the changes to the concept expression that were made by the learning model so that the user can understand the way the revised concept works after the learning model has modified it. The GUI provides a history capability so that all the previous versions of a concept that have been saved can be chosen and compared to the current version of the concept. The GUI may provide quality metrics to the user so that the user can compare the quality of previous concept models with the current concept model. The GUI may automatically recalculate the quality metrics, either on demand, or at intervals the user specifies in the settings (e.g., every 5 minutes, etc.) The user may be informed by the GUI when it is recalculating the quality metrics, and when the recalculations are complete.

The inference engine may receive user input including an assessment of a level of accuracy of the application of the rule to the at least two objects in the second plurality of objects. The method 500 may include generating at least one metric of a level of quality of the application of the rule. The method 500 may include modifying the inference visualization dashboard to include a display of the at least one metric.

The system 100 may receive user input that includes an identification of a concept associated with at least one object in the first plurality of objects. A concept may provide additional detail regarding the object and its uses and/or interactions with other objects.

The GUI may include an inference visualization dashboard feature that allows users to visualize what is in the database (concept activation data over time) in a multiplicity of ways. The inference dashboard displays time-based views of the output of the inference engine to show the activation of concepts in a video stream over time as well as summaries and analysis of activity from the sensor data. The GUI's inference visualization dashboard contains a time-window selector. The user can easily set the start and end points of the time window. Once the user completes the time window selection, they press the "UPDATE" button, and the visualization dashboard will generate a revised set of visualizations that reflect the activity in the desired time window. The time window can be set to any duration that contains data. The GUI's inference visualization dashboard will offer the user options for comparisons. Current data can be compared to any previous data. For example: Today compared to the last 3 days (or N days), or this week compared to the same week one year ago, and other time comparisons. The inference visualization dashboard allows the user to request alerts for concept activations or other metrics trigger a message to be sent to any standardized messaging system (e-mail, SMS, webhook, a custom mobile app or other). A single receiver or multiple receivers can be specified by the user. The user can use the GUI to specify which concepts or virtual concepts should lead to an alert, and who that alert should be sent to. e.g., PERSON-FELL should cause an alert to be sent to the security staff. If different levels of severity for alerts are needed, the user can specify the specific levels of alerting for variations: e.g., if a PERSON-FELL signal is true for over 5 seconds, it is a yellow alert, but if it is true for over 30 seconds, it is a red alert. The alert messages can be configured to include a natural language explanation of the reasoning behind the learning system's decision to apply the concept in question to this video. These will be expressed in the contest of any virtual concepts: e.g. If there is an L1 concept active related to keeping people safe, the output would be. "There is a person in danger because they are too close to the cement mixer." The alert messages can be configured to include a copy of a video or a link to a web page to view a video that shows using video-overlays the reason for the triggering of the alert. The alert messages will offer the user the option of declaring this event to be a false positive, and optionally giving the user the option to send a natural language message back to the system to provide information about the false positive error. e.g.: The user sends the system the message: "This was not a dangerous situation because the person was far enough away from the cement mixer".

In one embodiment, a method for generating rules from and applying rules to video files includes processing, by a machine vision component executing on a first computing device and in communication with a learning system, a first video file to detect a first plurality of objects in the first video file; displaying, by the learning system, on a display of a second computing device, the processed first video file; receiving, by the learning system, from the second computing device, user input including an identification of at least two objects in the first plurality of objects and an identification of a rule applicable to the at least two objects in the first plurality of objects; generating, by an inference engine executed by the learning system, an inference visualization displaying, on the display of the second computing device, a time-based view of an application of the rule to a given video frame in the first video file; receiving user input identifying an expected outcome of applying the rule to the given video frame; and modifying, by the learning system, the rule, wherein the modified rule includes a characteristic that satisfies the expected behavior. For example, and with reference to the teaching system feedback interface engine 112 in FIG. 1, a user may provide the expected output of a rule (which may be referred to herein as, "ground truth") and the learning system 103 can learn which combinations of data from the neural network are best used to create a rule that matches the ground truth. For example, a rule for 'hammering' may be written which would result in categorization of a video clip of a person holding a hammer as "hammering". The user may identify additional times that are considered 'hammering' by the user or times currently considered 'hammering' which are incorrectly labeled. Consider a case where the user sees a video frame of a human walking with a hammer but not using it—the user may not consider this an example of 'hammering' and the learning system may automatically learn to adjust the rule to be 'person holding hammer and walking is not hammering'. Such adjustment may be done through the application of symbolic reasoning, evolutionary algorithms, and/or other AI techniques.

In one embodiment, a method for generating rules from and applying rules to video files includes processing, by a machine vision component executing on a first computing device and in communication with a learning system, a first video file to detect a first plurality of objects in the first video file; identifying, by the learning system, at least one interaction of at least two objects in the first plurality of objects; inferring a rule applicable to the interaction of at least two objects in the first plurality of objects; generating, by the inference engine, an inference visualization displaying a time-based view of at least one video frame in the first video file and an associated application of the inferred rule; displaying, by the learning system, on a display of the second computing device, the generated inference visualization; and receiving, from the second computing device, user input confirming the validity of the inferred rule. As an example, and with reference to the learning system 103, the system 100 may execute methods to identify objects, track such objects, and infer rules without or regardless of user-provided rules. The effect or frequency of certain object patterns may be learned with repeated observation and new rules which identify common patterns can be proposed for review by a user. Consider a case where a manufacturing floor is observed for activity such as hammering, welding, etc. But at night the camera observes people enter the work area with brooms and dust pans. Repeated observation of this activity may result in the learning engine proposing a new activity for review by the user (in this example, the user may identify the activity as 'cleaning'). For such generalized learning, unlabeled object recognition by the neural network can be advantageous (i.e., a generic 'object' label when the 'broom' label may not have been learned). In conjunction with the methods and systems described above, once a new rule is identified, the neural network may be automatically trained to recognize components of the rule (such as the 'broom'), or the rule learned by the learning system may be improved with reference to a provided 'ground truth'.

In some embodiments, the system 100 includes non-transitory, computer-readable medium comprising computer program instructions tangibly stored on the non-transitory computer-readable medium, wherein the instructions are executable by at least one processor to perform each of the steps described above in connection with FIGS. 2-5.

It should be understood that the systems described above may provide multiple ones of any or each of those components and these components may be provided on either a standalone machine or, in some embodiments, on multiple machines in a distributed system. The phrases 'in one embodiment,' 'in another embodiment,' and the like, generally mean that the particular feature, structure, step, or characteristic following the phrase is included in at least one embodiment of the present disclosure and may be included in more than one embodiment of the present disclosure. Such phrases may, but do not necessarily, refer to the same embodiment. However, the scope of protection is defined by the appended claims; the embodiments mentioned herein provide examples.

The terms "A or B", "at least one of A or/and B", "at least one of A and B", "at least one of A or B", or "one or more of A or/and B" used in the various embodiments of the present disclosure include any and all combinations of words enumerated with it. For example, "A or B", "at least one of A and B" or "at least one of A or B" may mean (1) including at least one A, (2) including at least one B, (3) including either A or B, or (4) including both at least one A and at least one B.

Any step or act disclosed herein as being performed, or capable of being performed, by a computer or other machine, may be performed automatically by a computer or other machine, whether or not explicitly disclosed as such herein. A step or act that is performed automatically is performed solely by a computer or other machine, without human intervention. A step or act that is performed automatically may, for example, operate solely on inputs received from a computer or other machine, and not from a human. A step or act that is performed automatically may, for example, be initiated by a signal received from a computer or other machine, and not from a human. A step or act that is performed automatically may, for example, provide output to a computer or other machine, and not to a human.

The systems and methods described above may be implemented as a method, apparatus, or article of manufacture using programming and/or engineering techniques to produce software, firmware, hardware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be LISP, PROLOG, PERL, C, C++, C #, JAVA, Python, Rust, Go, or any compiled or interpreted programming language.

Each such computer program may be implemented in a computer program product tangibly embodied in a machine-readable storage device for execution by a computer processor. Method steps may be performed by a computer processor executing a program tangibly embodied on a computer-readable medium to perform functions of the methods and systems described herein by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of computer-readable devices, firmware, programmable logic, hardware (e.g., integrated circuit chip; electronic devices; a computer-readable non-volatile storage unit; non-volatile memory, such as semiconductor memory devices, including EPROM, EEPROM, and flash memory devices; magnetic disks such as internal hard disks and removable disks; magneto-optical disks; and CD-ROMs). Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium. A computer may also receive programs and data (including, for example, instructions for storage on non-transitory computer-readable media) from a second computer providing access to the programs via a network transmission line, wireless transmission media, signals propagating through space, radio waves, infrared signals, etc.

In some embodiments, the system 100 includes non-transitory, computer-readable medium comprising computer program instructions tangibly stored on the non-transitory computer-readable medium, wherein the instructions are executable by at least one processor to perform each of the steps described above in connection with FIGS. 2-5.

The systems and methods described above may be implemented as a method, apparatus, or article of manufacture using programming and/or engineering techniques to produce software, firmware, hardware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be LISP, PROLOG, PERL, C, C++, C #, JAVA, Python, Rust, Go, or any compiled or interpreted programming language.

Each such computer program may be implemented in a computer program product tangibly embodied in a machine-readable storage device for execution by a computer processor. Method steps may be performed by a computer processor executing a program tangibly embodied on a computer-readable medium to perform functions of the methods and systems described herein by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of computer-readable devices, firmware, programmable logic, hardware (e.g., integrated circuit chip; electronic devices; a computer-readable non-volatile storage unit; non-volatile memory, such as semiconductor memory devices, including EPROM, EEPROM, and flash memory devices; magnetic disks such as internal hard disks and removable disks; magneto-optical disks; and CD-ROMs). Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or grayscale pixels on paper, film, display screen, or other output medium. A computer may also receive programs and data (including, for example, instructions for storage on non-transitory computer-readable media) from a second computer providing access to the programs via a network transmission line, wireless transmission media, signals propagating through space, radio waves, infrared signals, etc.

Figure 6A:
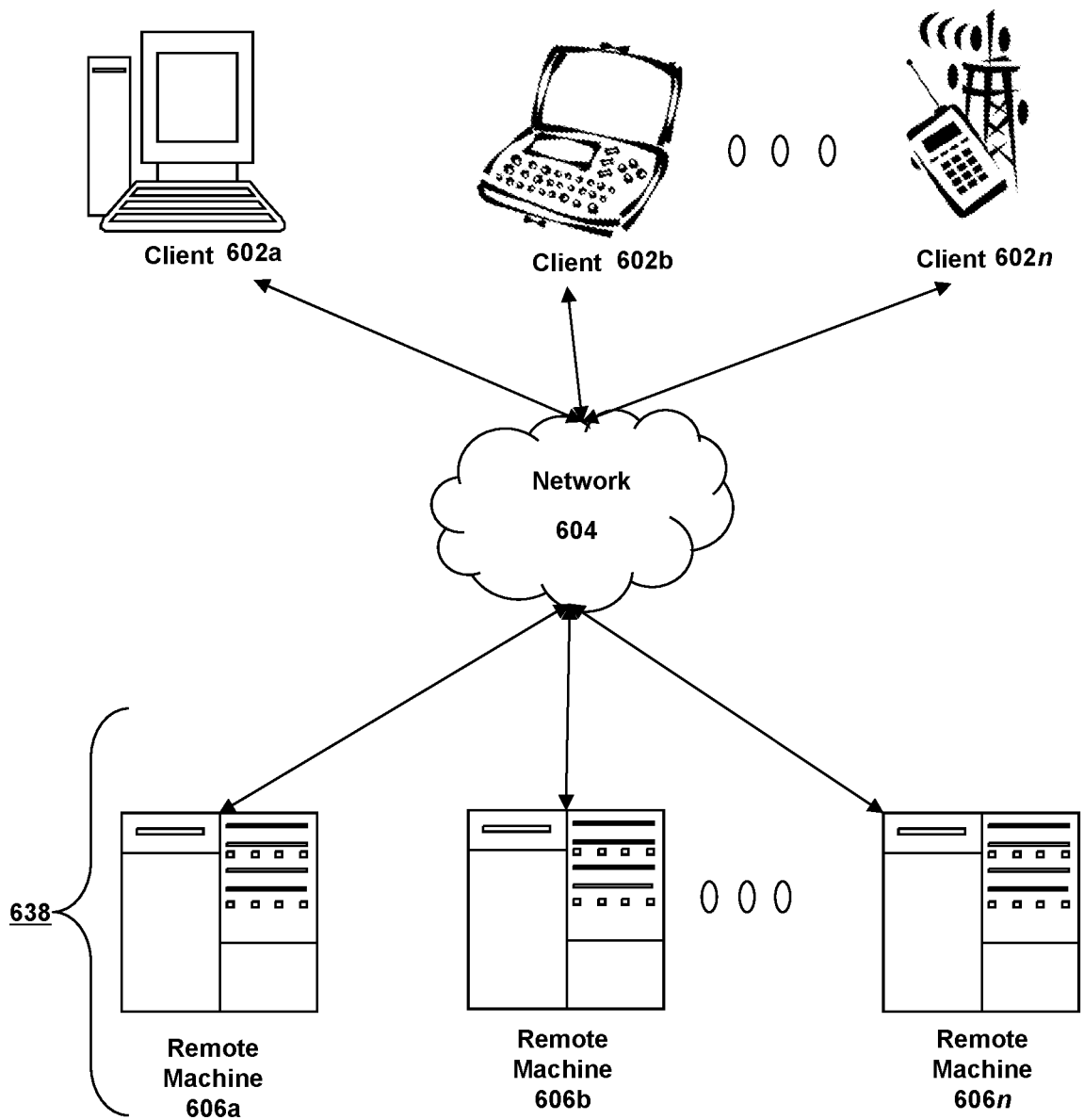
FIGS. 6A-6C are block diagrams depicting embodiments of computers useful in connection with the methods and systems described herein.
Figure 6B:
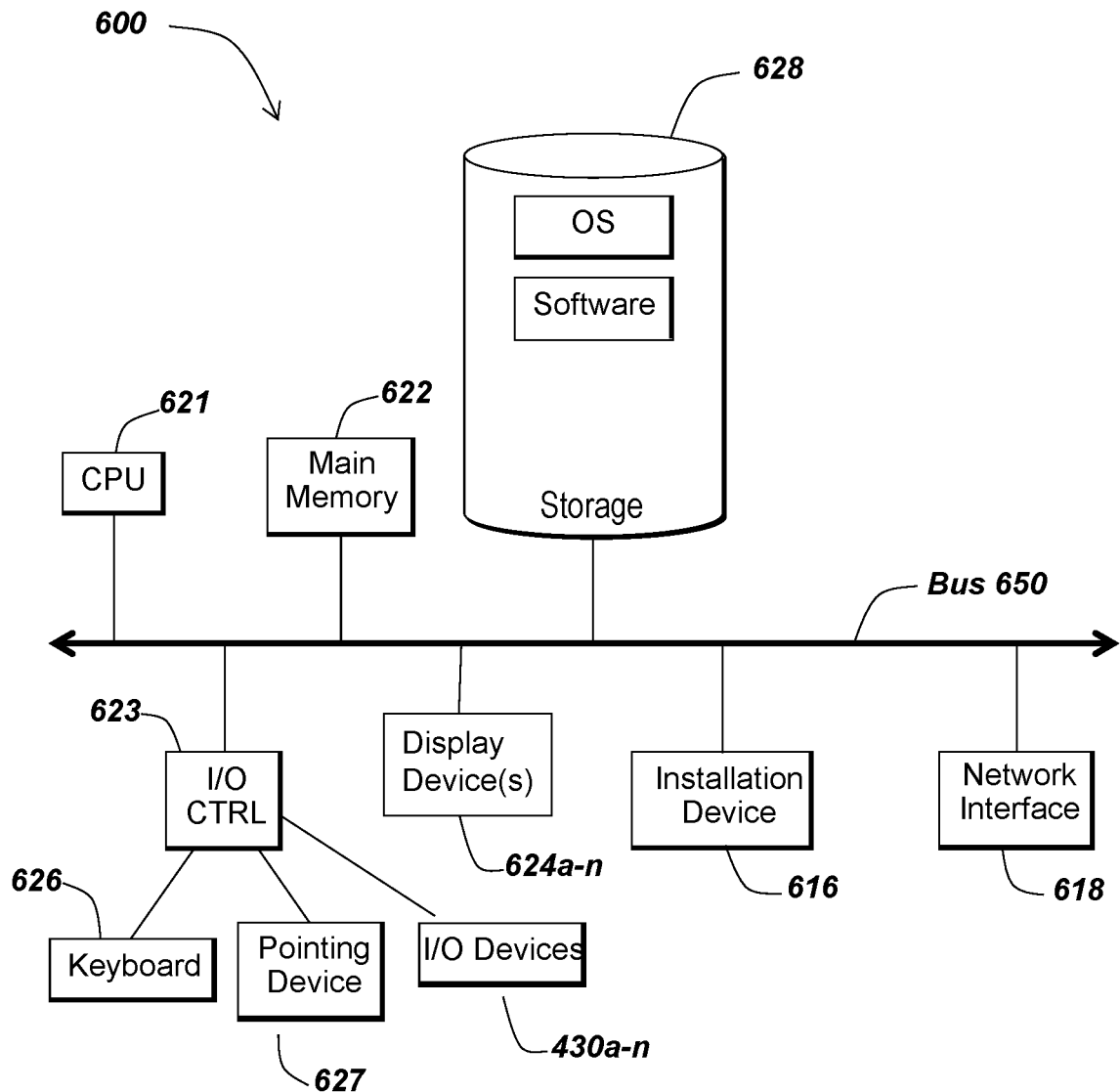
Figure 6C:
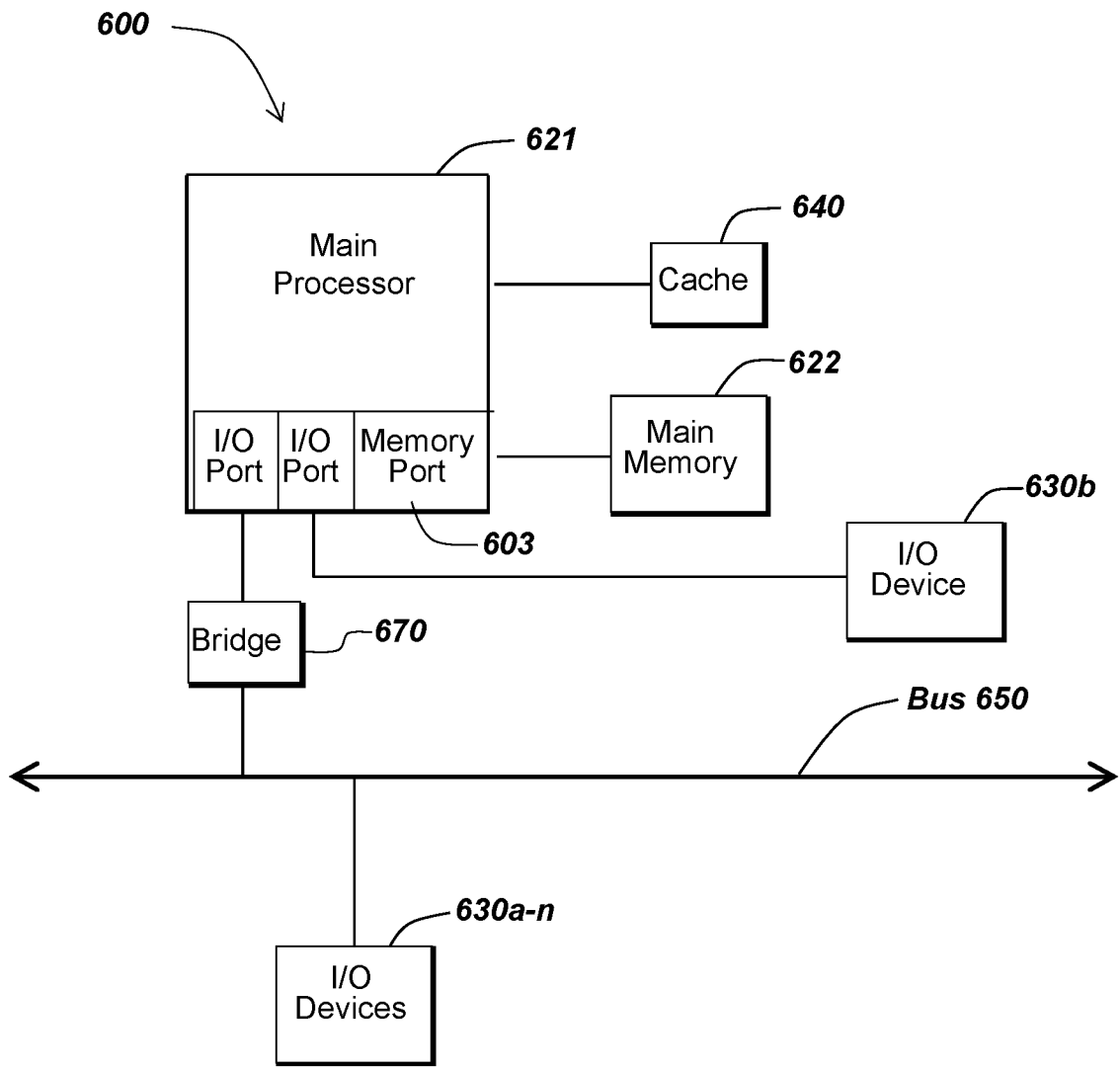

Referring now to FIGS. 6A, 6B, and 6C, block diagrams depict additional detail regarding computing devices that may be modified to execute novel, non-obvious functionality for implementing the methods and systems described above.

Referring now to FIG. 6A, an embodiment of a network environment is depicted. In brief overview, the network environment comprises one or more clients 602a-602n (also generally referred to as local machine(s) 602, client(s) 602, client node(s) 602, client machine(s) 602, client computer(s) 602, client device(s) 602, computing device(s) 602, endpoint(s) 602, or endpoint node(s) 602) in communication with one or more remote machines 606a-606n (also generally referred to as server(s) 606 or computing device(s) 606) via one or more networks 404.

Although FIG. 6A shows a network 604 between the clients 602 and the remote machines 606, the clients 602 and the remote machines 606 may be on the same network 604. The network 604 can be a local area network (IAN), such as a company Intranet, a metropolitan area network (MAN), or a wide area network (WAN), such as the Internet or the World Wide Web. In some embodiments, there are multiple networks 604 between the clients 602 and the remote machines 606. In one of these embodiments, a network 604' (not shown) may be a private network and a network 604 may be a public network. In another of these embodiments, a network 604 may be a private network and a network 604'a public network. In still another embodiment, networks 604 and 604' may both be private networks. In yet another embodiment, networks 604 and 604' may both be public networks.

The network 604 may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, an SDH (Synchronous Digital Hierarchy) network, a wireless network, a wireline network, an Ethernet, a virtual private network (VPN), a software-defined network (SDN), a network within the cloud such as AWS VPC (Virtual Private Cloud) network or Azure Virtual Network (VNet), and a RDMA (Remote Direct Memory Access) network. In some embodiments, the network 404 may comprise a wireless link, such as an infrared channel or satellite band. The topology of the network 604 may be a bus, star, or ring network topology. The network 604 may be of any such network topology as known to those ordinarily skilled in the art capable of supporting the operations described herein. The network may comprise mobile telephone networks utilizing any protocol or protocols used to communicate among mobile devices (including tables and handheld devices generally), including AMPS, TDMA, CDMA, GSM, GPRS, UMTS, or LTE. In some embodiments, different types of data may be transmitted via different protocols. In other embodiments, the same types of data may be transmitted via different protocols.

A client 602 and a remote machine 606 (referred to generally as computing devices 600, devices 600, or as machines 600) can be any workstation, desktop computer, laptop or notebook computer, server, portable computer, mobile telephone, mobile smartphone, or other portable telecommunication device, media playing device, a gaming system, mobile computing device, or any other type and/or form of computing, telecommunications or media device that is capable of communicating on any type and form of network and that has sufficient processor power and memory capacity to perform the operations described herein. A client 602 may execute, operate or otherwise provide an application, which can be any type and/or form of software, program, or executable instructions, including, without limitation, any type and/or form of web browser, web-based client, client-server application, an ActiveX control, a JAVA applet, a webserver, a database, an HPC (high performance computing) application, a data processing application, or any other type and/or form of executable instructions capable of executing on client 602.

In one embodiment, a computing device 606 provides functionality of a web server. The web server may be any type of web server, including web servers that are open-source web servers, web servers that execute proprietary software, and cloud-based web servers where a third party hosts the hardware executing the functionality of the web server. In some embodiments, a web server 606 comprises an open-source web server, such as the APACHE servers maintained by the Apache Software Foundation of Delaware. In other embodiments, the web server executes proprietary software, such as the INTERNET INFORMATION SERVICES products provided by Microsoft Corporation of Redmond, WA, the ORACLE IPLANET web server products provided by Oracle Corporation of Redwood Shores, CA, or the ORACLE WEBLOGIC products provided by Oracle Corporation of Redwood Shores, CA.

In some embodiments, the system may include multiple, logically-grouped remote machines 606. In one of these embodiments, the logical group of remote machines may be referred to as a server farm 638. In another of these embodiments, the server farm 638 may be administered as a single entity.

FIGS. 6B and 6C depict block diagrams of a computing device 600 useful for practicing an embodiment of the client 602 or a remote machine 606. As shown in FIGS. 6B and 6C, each computing device 600 includes a central processing unit 621, and a main memory unit 622. As shown in FIG. 6B, a computing device 600 may include a storage device 628, an installation device 616, a network interface 618, an I/O controller 623, display devices 624a-n, a keyboard 626, a pointing device 627, such as a mouse, and one or more other I/O devices 630a-n. The storage device 628 may include, without limitation, an operating system and software. As shown in FIG. 6C, each computing device 600 may also include additional optional elements, such as a memory port 603, a bridge 670, one or more input/output devices 630a-n (generally referred to using reference numeral 630), and a cache memory 640 in communication with the central processing unit 621.

The central processing unit 621 is any logic circuitry that responds to and processes instructions fetched from the main memory unit 622. In many embodiments, the central processing unit 621 is provided by a microprocessor unit, such as: those manufactured by Intel Corporation of Mountain View, CA; those manufactured by Motorola Corporation of Schaumburg, IL; those manufactured by Transmeta Corporation of Santa Clara, CA; those manufactured by International Business Machines of White Plains, NY; or those manufactured by Advanced Micro Devices of Sunnyvale, CA Other examples include RISC-V processors, SPARC processors, ARM processors, processors used to build UNIX/LINUX "white" boxes, and processors for mobile devices. The computing device 600 may be based on any of these processors, or any other processor capable of operating as described herein.

Main memory unit 622 may be one or more memory chips capable of storing data and allowing any storage location to be directly accessed by the microprocessor 621. The main memory 622 may be based on any available memory chips capable of operating as described herein. In the embodiment shown in FIG. 6B, the processor 621 communicates with main memory 622 via a system bus 650. FIG. 6C depicts an embodiment of a computing device 600 in which the processor communicates directly with main memory 622 via a memory port 603. FIG. 6C also depicts an embodiment in which the main processor 621 communicates directly with cache memory 640 via a secondary bus, sometimes referred to as a backside bus. In other embodiments, the main processor 621 communicates with cache memory 640 using the system bus 650.

In the embodiment shown in FIG. 6B, the processor 621 communicates with various I/O devices 630 via a local system bus 650. Various buses may be used to connect the central processing unit 621 to any of the I/O devices 630, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 624, the processor 621 may use an Advanced Graphics Port (AGP) to communicate with the display 624. FIG. 6C depicts an embodiment of a computing device 600 in which the main processor 621 also communicates directly with an I/O device 630b via, for example, HYPERTRANSPORT, RAPIDIO, or INFINI-BAND communications technology.

One or more of a wide variety of I/O devices 630a-n may be present in or connected to the computing device 600, each of which may be of the same or different type and/or form. Input devices include keyboards, mice, trackpads, trackballs, microphones, scanners, cameras, and drawing tablets. Output devices include video displays, speakers, inkjet printers, laser printers, 3D printers, and dye-sublimation printers. The I/O devices may be controlled by an I/O controller 623 as shown in FIG. 6B. Furthermore, an I/O device may also provide storage and/or an installation medium 616 for the computing device 600. In some embodiments, the computing device 600 may provide USB connections (not shown) to receive handheld USB storage devices such as the USB Flash Drive line of devices manufactured by Twintech Industry, Inc. of Los Alamitos, CA [olio] Referring still to FIG. 6B, the computing device 600 may support any suitable installation device 616, such as hardware for receiving and interacting with removable storage; e.g., disk drives of any type, CD drives of any type, DVD drives, tape drives of various formats, USB devices, external hard drives, or any other device suitable for installing software and programs. In some embodiments, the computing device 600 may provide functionality for installing software over a network 604. The computing device 600 may further comprise a storage device, such as one or more hard disk drives or redundant arrays of independent disks, for storing an operating system and other software. Alternatively, the computing device 600 may rely on memory chips for storage instead of hard disks.

Furthermore, the computing device 600 may include a network interface 618 to interface to the network 604 through a variety of connections including, but not limited to, standard telephone lines, LAN or WAN links (e.g., 802.11, T1, T3, 56 kb, X.25, SNA, DECNET, RDMA), broadband connections (e.g., ISDN, Frame Relay, ATM, Gigabit Ethernet, Ethernet-over-SONET), wireless connections, virtual private network (VPN) connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, 802.15.4, Bluetooth, ZIGBEE, CDMA, GSM, WiMax, and direct asynchronous connections). In one embodiment, the computing device 600 communicates with other computing devices 600' via any type and/or form of gateway or tunneling protocol such as GRE, VXLAN, IPIP, SIT, ip6tnl, VTI and VTI6, IP6GRE, FOU, GUE, GENEVE, ERSPAN, Secure Socket Layer (SSL) or Transport Layer Security (TIS). The network interface 618 may comprise a built-in network adapter, network interface card, PCMCIA network card, card bus network adapter, wireless network adapter, USB network adapter, modem, or any other device suitable for interfacing the computing device 600 to any type of network capable of communication and performing the operations described herein.

In further embodiments, an I/O device 630 may be abridge between the system bus 650 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 600 of the sort depicted in FIGS. 6B and 6C typically operates under the control of operating systems, which control scheduling of tasks and access to system resources. The computing device 600 can be running any operating system such as any of the versions of the MICROSOFT WINDOWS operating systems, the different releases of the UNIX and LINUX operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 7, WINDOWS 8, WINDOWS VISTA, WINDOWS 10, and WINDOWS 11 all of which are manufactured by Microsoft Corporation of Redmond, WA; MAC OS manufactured by Apple Inc. of Cupertino, CA; OS/2 manufactured by International Business Machines of Armonk, NY; Red Hat Enterprise Linux, a Linux-variant operating system distributed by Red Hat, Inc., of Raleigh, NC; Ubuntu, a freely-available operating system distributed by Canonical Ltd. of London, England; CentOS, a freely-available operating system distributed by the centos.org community; SUSE Linux, a freely-available operating system distributed by SUSE, or any type and/or form of a Unix operating system, among others.

Having described certain embodiments of methods and systems for training and execution of improved learning systems for identification of components in time-based data streams, it will be apparent to one of skill in the art that other embodiments incorporating the concepts of the disclosure may be used. Therefore, the disclosure should not be limited to certain embodiments, but rather should be limited only by the spirit and scope of the following claims.

What is claimed is:

1. A method for training a self-directed, dynamic learning system to identify components of time-based data streams, the method comprising:

processing, by a machine vision component executing on a first computing device and in communication with a self-directed, dynamic learning system executing on a second computing device, a video file to detect at least one object in the video file;

displaying, by the self-directed, dynamic learning system, the processed video file, wherein displaying further comprises generating a user interface including a display of at least a portion of the processed video file and an identification of the detected at least one object, wherein displaying further comprises segmenting at least one image of the video file into at least one region;

receiving, by the self-directed, dynamic learning system, user input including an identification of an unidentified object in the processed video file displayed by the learning system;

processing, by a learning engine of the self-directed, dynamic learning system, the at least one region;

generating, by the self-directed, dynamic learning system, a proposed identification of at least one potential object within the at least one region;

displaying, by the self-directed, dynamic learning system, the at least one region and the at least one potential object; and receiving, by the self-directed, dynamic learning system, user input accepting the proposed identification.

2. The method of claim 1 further comprising generating, by a learning engine in the self-directed, dynamic learning system, at least one inferred characteristic of the unidentified object, wherein generating further comprises processing, by the learning engine, the user input and the processed video file.

3. The method of claim 1, wherein displaying further comprises displaying the processed video file on a display of the second computing device.

4. The method of claim 1, wherein displaying further comprises displaying the processed video file on a display of a third computing device.

5. The method of claim 1 further comprising modifying the generated user interface to include an identification of the detected at least one object.

6. The method of claim 1 further comprising modifying the generated user interface to include an identification of the unidentified object identified in the user input.

7. The method of claim 1 further comprising directing, by the self-directed, dynamic learning system, incorporation of the proposed identification into a recognition component of the machine vision component.

8. The method of claim 1 further comprising:
processing, by the self-directed, dynamic learning system, the at least one region;
generating, by the self-directed, dynamic learning system, a proposed identification of at least one potential object within the at least one region; and
receiving, by the self-directed, dynamic learning system, from a rules inference engine in communication with the learning system, input directing acceptance of the proposed identification.

9. The method of claim 8 further comprising directing, by the self-directed, dynamic learning system, incorporation of the proposed identification into a recognition component of the machine vision component.

\* \* \* \* \*